United States Patent
Natanzon et al.

(10) Patent No.: US 9,639,295 B1
(45) Date of Patent: May 2, 2017

(54) METHOD AND APPARATUS FOR REDUCING SPLITTER LATENCY USING PARALLEL SPLITTING

(75) Inventors: Assaf Natanzon, Tel aviv (IL); Arieh Don, Newton, MA (US); Patrick Brian Riordan, West Newton, MA (US); Anestis Panidis, Weston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 433 days.

(21) Appl. No.: 13/436,715

(22) Filed: Mar. 30, 2012

(51) Int. Cl.
*G06F 3/00* (2006.01)
*G06F 3/06* (2006.01)
*G06F 13/12* (2006.01)

(52) U.S. Cl.
CPC .......... *G06F 3/0659* (2013.01); *G06F 13/126* (2013.01)

(58) Field of Classification Search
None
See application file for complete search history.

(56) References Cited

U.S. PATENT DOCUMENTS

| 5,845,147 | A * | 12/1998 | Vishlitzky et al. ............... 710/5 |
| 6,735,636 | B1 * | 5/2004 | Mokryn .............. G06F 13/4022 709/234 |
| 8,332,687 | B1 * | 12/2012 | Natanzon ............ G06F 11/1471 709/202 |
| 2003/0037127 | A1 * | 2/2003 | Shah et al. .................... 709/220 |

* cited by examiner

*Primary Examiner* — Henry Tsai
*Assistant Examiner* — Aurangzeb Hassan
(74) *Attorney, Agent, or Firm* — Krishnendu Gupta; Robert Kevin Perkins

(57) ABSTRACT

Example embodiments of the present invention provide for parallel replication of an IO received by a storage array. Such parallelism provide numerous benefits, including enqueuing the command phase of the write command at the storage array and the replication appliance in parallel, providing data still in memory (i.e., slot) and not destaged to disk, and providing data processing in parallel (e.g., validate checksum, validate data is good, validate internal data structures).

21 Claims, 6 Drawing Sheets

METHOD AND APPARATUS FOR REDUCING SPLITTER LATENCY USING PARALLEL SPLITTING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

Example embodiments of the present invention provide a method, an apparatus and a computer program product for reducing splitter latency using parallel splitting. The method includes forwarding a write command received from a host in parallel to a target and processing the write command in parallel with the target.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
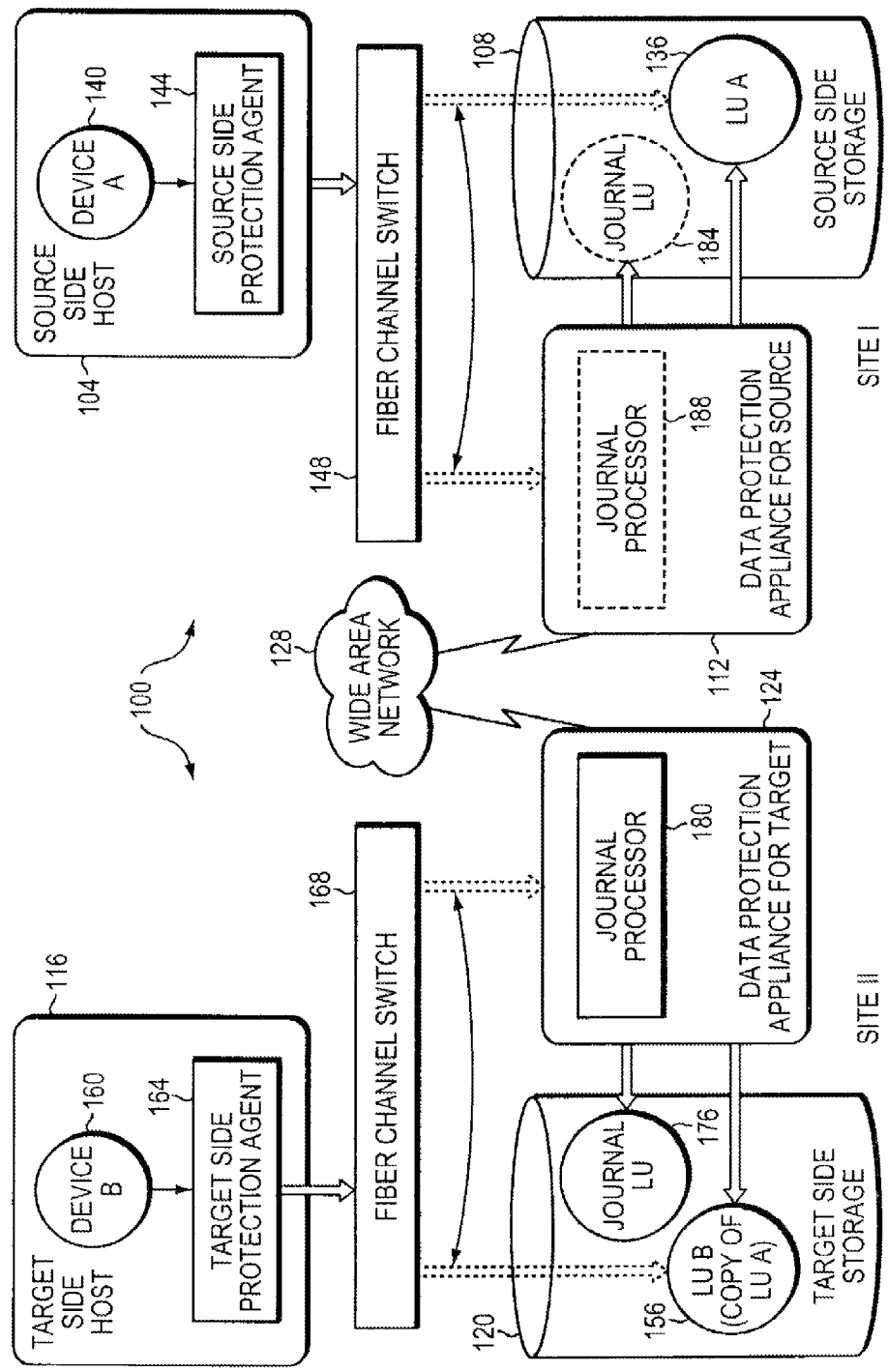
FIG. 1 is a simplified illustration of a data protection system, in accordance with an embodiment of the present invention.

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME —may be a volume which is exposed to a host by a virtualization layer and may span across more than one site; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands. System 100 includes source storage system 108 and target storage system 120.

Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
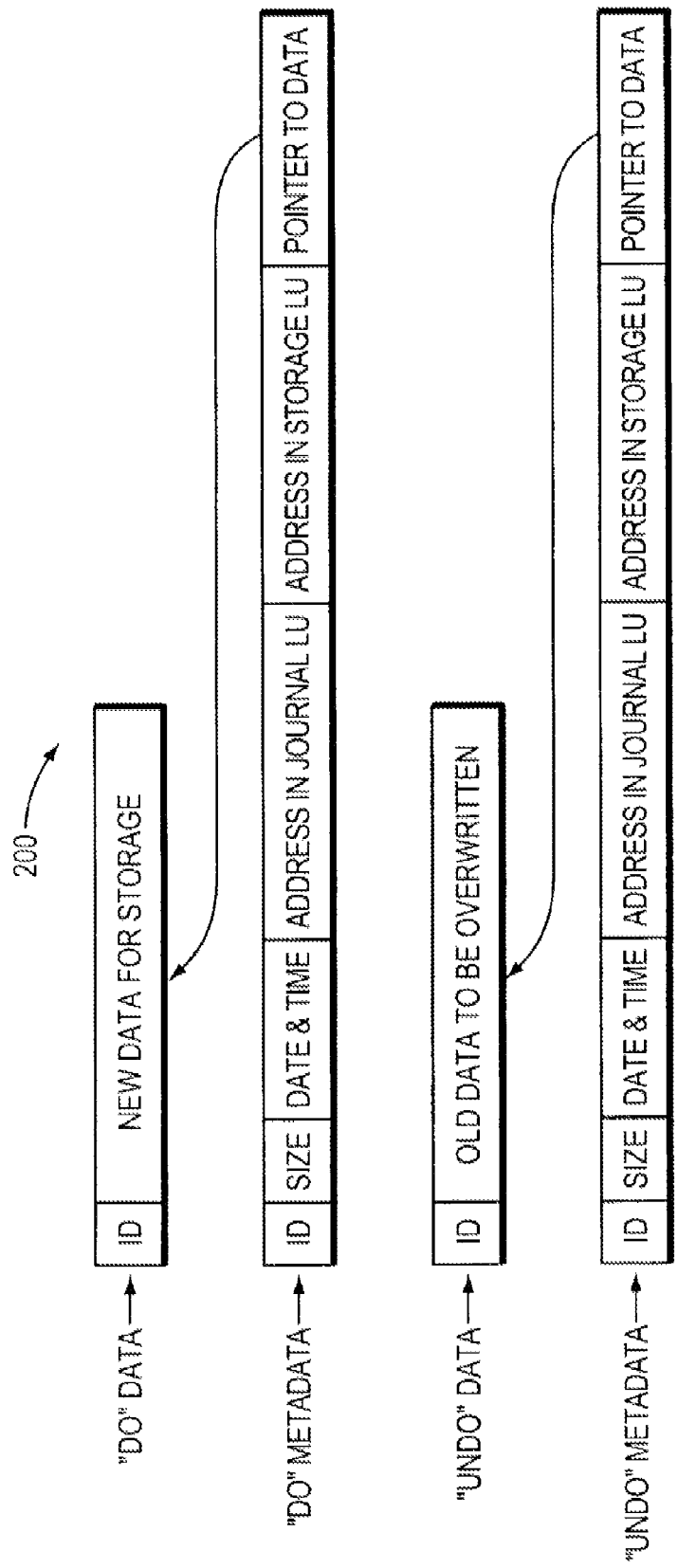
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
- one or more identifiers;
- a time stamp, which is the date & time at which the transaction was received by source side DPA 112;
- a write size, which is the size of the data block;
- a location in journal LU 176 where the data is entered;
- a location in LU B where the data is to be written; and
- the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Reducing Splitter Latency Using Parallel Splitting

Traditional replication of IOs written to a storage array is synchronous. For example, in traditional replication environments, a host sends a command phase to the storage array. The storage array then responds to the host with an acknowledgement. The host sends write data to the storage array to which the storage array response with another acknowledgment to trigger the host to send more data. When all data is accepted by the storage array, the storage array notifies the replication appliance that the storage array is ready to replicate the IO. The storage array then sends the data to the replication appliance. The replication appliance acknowledges the data, and once all data has been sent from the storage array to the replication appliance, the replication appliance sends the storage array the status. In turn, the storage array sends the host a status.

For example, with respect to replication of IOs from a host written to a Summetrix® storage array by EMC Corporation of Hopkinton, Mass. by a RecoverPoint Appliance (RPA) by EMC Corporation of Hopkinton, Mass., a host sends a Small Computer System Interface (SCSI) Command Descriptor Block (CDB) to the Symmetrix which is then placed in a queue. The CDB remains in the queue until the Symmetrix has resources available to process it. Once it is processed, the Symmetrix sends a SCSI Transfer Ready (XFR_RDY) message to the host, which triggers to the host to begin sending data. The data is stored to locations in the Symmetrix referred to as slots (typically 64 KB). The Symmetrix then responds to the host with a XFR_RDY message to trigger the host to send more data.

However, once all data for the IO is received from the host by the Symmetrix, the Symmetrix does not yet send a status to the host because replication of the IO to the RPA has not yet begun. The Symmetrix then sends the CDB to the RPA once all data is received from the host. The RPA enqueues, processes the CDB, and sends a XFR_RDY message to the Symmetrix. The Symmetrix then begins sending data to the RPA. The RPA then responds with additional XFR_RDY messages triggering the Symmetrix to send further data of the IO. Once all data for the IO has been received by the RPA, the RPA sends a status to the Symmetrix. If the status is good, the Symmetrix sends the status to the host. Most of the time is spent waiting in the queue because data is sent so fast (i.e., fibrechannel) that the amount of data sent is relatively inconsequential.

When the Symmetrix gets data in a slot, the slot is set as write pending. In other words, the data received by the front end of the Symmetrix and stored in the slot sits in memory until back end of the Symmetrix destages the data to disk.

Depending on the load on the Symmetrix, if the data in the slot is destaged to disk very quickly, the data may be on disk but not longer in memory (i.e., not in a slot) when it needs to be replicated to the RPA. When the Symmetrix sends the CDB to RPA to which the RPA responds with an XFR_RDY message, the data associated with the CDB may be out of the slot on disk, requiring processing time of approximately 10-15 milliseconds to retrieve the data from disk before it may be sent to the RPA. In response to subsequent XFR_RDY messages from the RPA, that data, too, may be destaged, requiring further delay to retrieve the data from disk for replication to the RPA. Therefore, the latency caused by the synchronous replication (i.e., waiting for queue in the Symmetrix, waiting for the queue in the RPA, retrieving data out of slot on disk) presents significant performance costs.

Traditionally, the Symmetrix acted as a SCSI target for the host and a SCSI initiator for the target. Symmetrix provided a point in time (PIT) clone in which the Symmetrix finished its functions as a SCSI target before performing its functions as a SCSI initiator, so performance was not an issue and parallelism was not needed. However, with the introduction of CDP provided by the RPA, such synchronous operation is insufficient.

Example embodiments of the present invention provide for parallel replication. Such parallelism provide numerous benefits, including enqueuing the command phase of the write command at the storage array and the replication appliance in parallel, providing data still in memory (i.e., slot) and not destaged to disk, and providing data processing in parallel (e.g., validate checksum, validate data is good, validate internal data structures).

Figure 3:
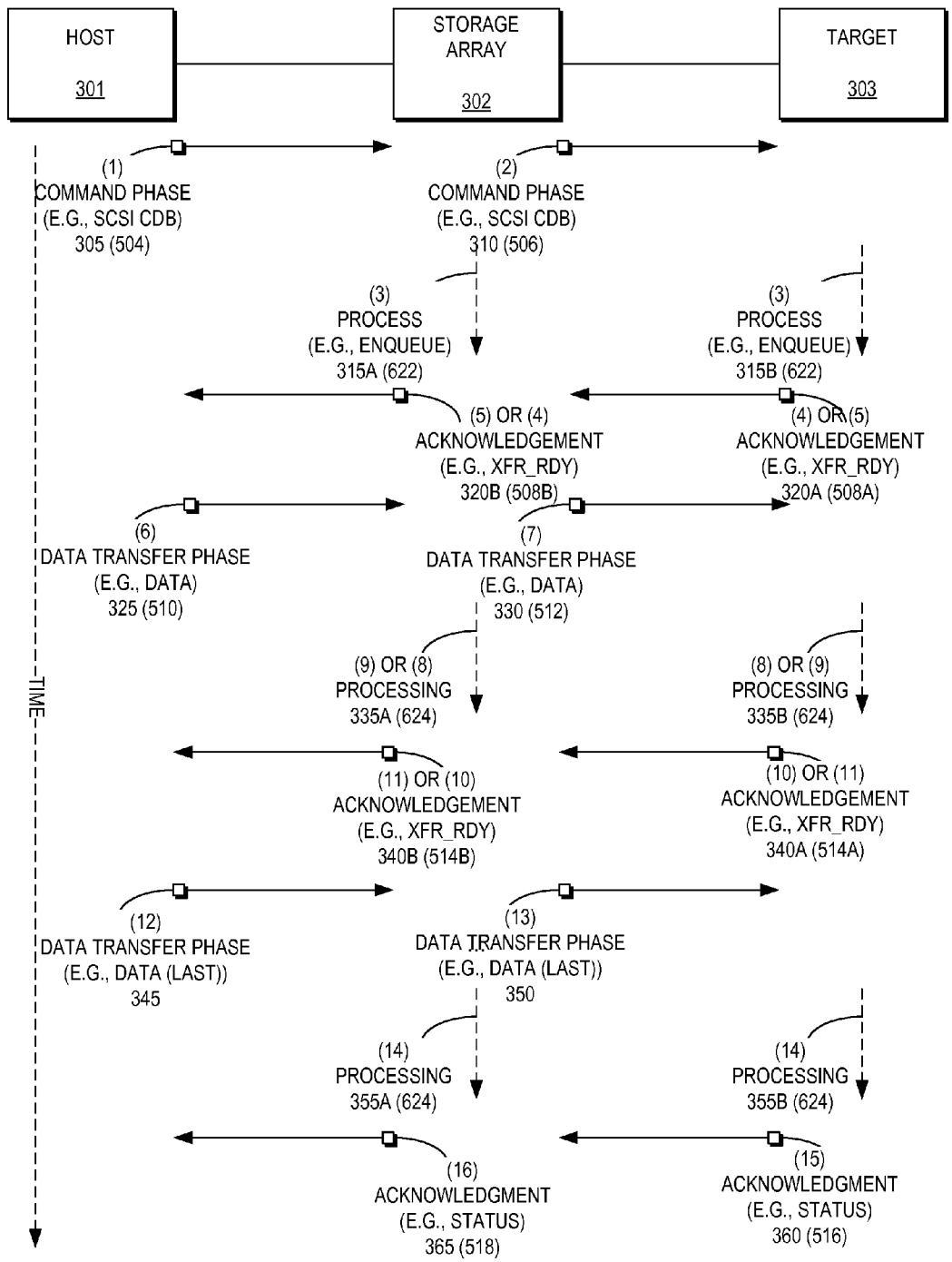
FIG. 3 is a block diagram illustrating a system and interactions between the components thereof according to an example embodiment of the present invention.
Figure 6:
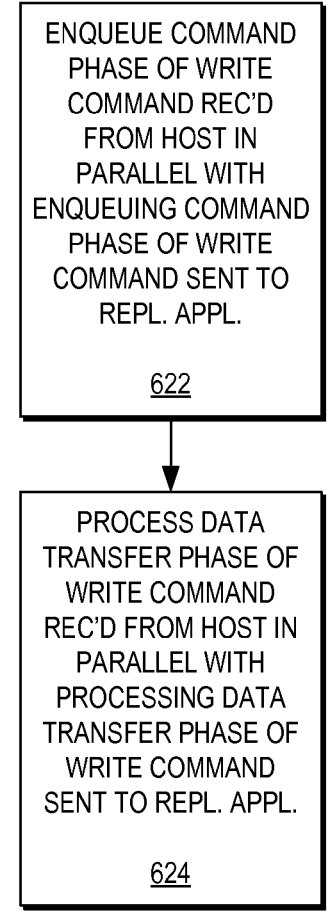

FIG. 3 is a block diagram illustrating a system and interactions between the components thereof according to an example embodiment of the present invention. FIG. 3 may be studied in conjunction with the flow diagrams of FIGS. 4-6 illustrating methods of the present invention according to example embodiments of the present invention.

Figure 4:
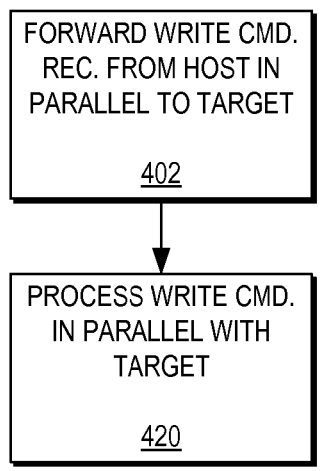
FIGS. 4-6 are flow diagrams illustrating methods of the present invention according to example embodiments of the present invention.
Figure 5:
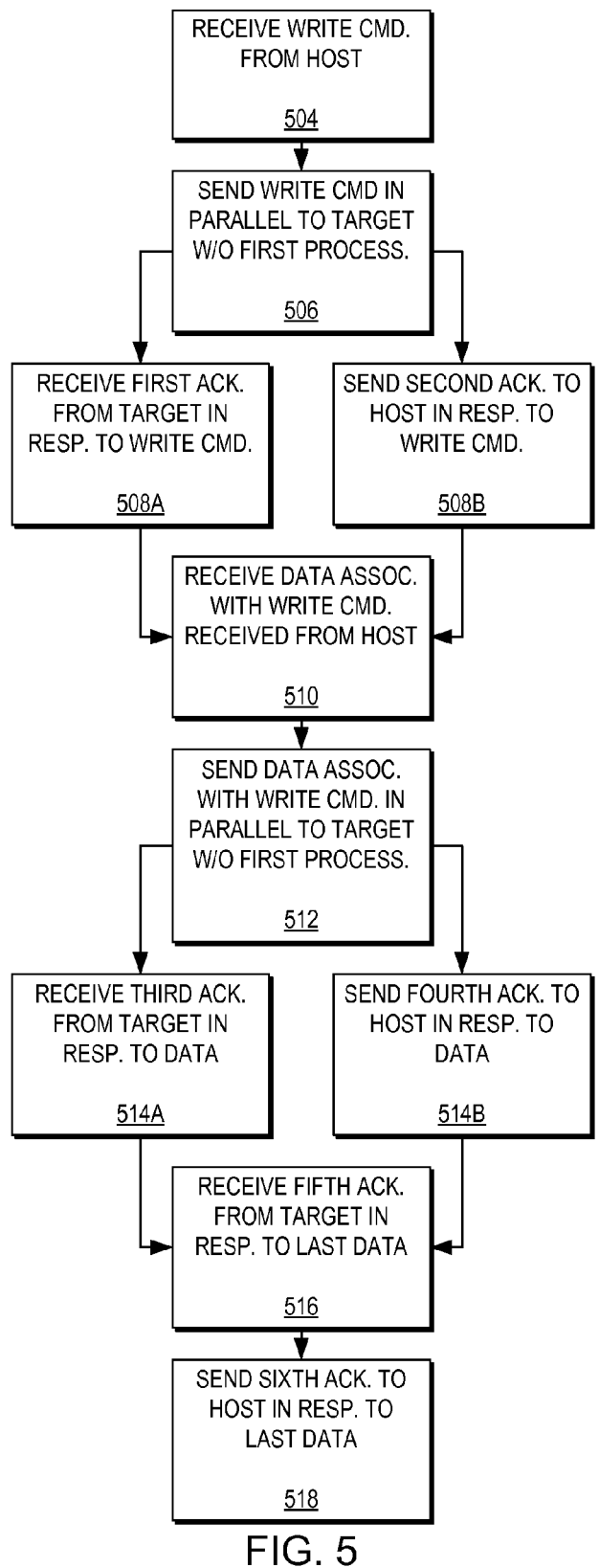

As illustrated in FIGS. 3 and 4, a storage array 302 may forward a write command received from a host 301 in parallel to a target 303 (402) and process the write command in parallel with the target 303 (420).

The write command may comprise a command phase and a data transfer phase. As illustrated in FIGS. 3 and 5, to forward the write command received from the host 301 in parallel to the target 303, (1) the storage array 302 receives the command phase (e.g., SCSI CDB) of the write command from the host 301 305 (504). However, the storage array 302 does not wait to process the CDB in its queue but rather (2) forwards the command phase (e.g., SCSI CDB) of the write command in parallel to the target 303 without first processing (e.g., enqueuing) the command phase (e.g., SCSI CDB) of the write command 310 (506). Accordingly, the command phase (e.g., SCSI CDB) waits in the storage array queue in parallel with the target queue. As illustrated in FIGS. 3 and 6, to (3) process the write command in parallel with the target 303, the storage array 302 may enqueue the command phase (e.g., SCSI CDB) of the write command received from the host 301 315A (622) in parallel with enqueuing the command phase (e.g., SCSI CDB) of the write command sent to the replication appliance 303 315B (622).

Returning to FIGS. 3 and 5, the storage array 302 may (4) receive a first acknowledgment (e.g., XFR_RDY message) from the target 303 in response to the command phase (e.g., SCSI CDB) of the write command forwarded in parallel to the target 303 320A (508A) and (5) send a second acknowledgement (e.g., XFR_RDY message) to the host 301 in response to the command phase (e.g., SCSI CDB) of the write command received from the host 301 320B (508B). It should be understood that the order in which the first and second acknowledgements are sent does not matter and that the storage array 302 may (4) send a first acknowledgement (e.g., XFR_RDY message) to the host 301 in response to the command phase (e.g., SCSI CDB) of the write command received from the host 301 320B (508B) and (5) receive a second acknowledgment (e.g., XFR_RDY message) from the target 303 in response to the command phase (e.g., SCSI CDB) of the write command forwarded in parallel to the target 303 320A (508A).

The storage array 302 then may (6) receive the data transfer phase (e.g., data) of the write command received from the host 301 325 (510) and (7) forward the data transfer phase (e.g., data) of the write command in parallel to the target 303 without first processing the data transfer phase (e.g., data) of the write command 330 (512). For example, a Symmetrix may get data from the host 301 and put it in a slot. However, the Symmetrix does not process the data as write pending and ignore the RPA as in traditional replication. Rather, the Symmetrix immediately sends the data to the RPA.

As illustrated in FIGS. 3 and 6, to process the write command in parallel with the target, the storage array 302 may (8) process the data transfer phase (e.g., data) of the write command received from the host 301 in parallel 335A (624) with (9) processing the data transfer phase (e.g., data) of the write command sent to the target (e.g., replication appliance) 303 335B (624). It should be understood that the order in which the storage array 302 and target 303 process the data transfer phase does not matter and that the target 303 may process the data transfer phase (e.g., data) of the write command sent to the target (e.g., replication appliance) 303 335B (624) in parallel with and the storage array 302 (9) processing the data transfer phase (e.g., data) of the write command received from the host 301 335A 624).

Returning to FIGS. 3 and 5, at a certain point, the target 303 will produce an acknowledgement (e.g., XFR_RDY message). Thus, the storage array 302 may (10) receive a third acknowledgment (e.g., XFR_RDY message) from the target (e.g., replication appliance) 303 in response to the data transfer phase (e.g., data) of the write command forwarded in parallel to the target (e.g., replication appliance) 303 340A (514A). However, the storage array 302 may not be able to send data in response. Thus, the storage array 302 may (11) send a fourth acknowledgement (e.g., XFR_RDY message) to the host 301 in response to the data transfer phase (e.g. data) of the write command received from the host 301 340B (514B). It should be understood that the order in which the storage array 302 and target 303 acknowledge the data transfer phase does not matter and that the storage array 302 may (10) send a third acknowledgement (e.g., XFR_RDY message) to the host 301 in response to the data transfer phase (e.g. data) of the write command received from the host 301 340B (514B) and (11) receive a fourth acknowledgment (e.g., XFR_RDY message) from the target (e.g., replication appliance) 303 in response to the data transfer phase (e.g., data) of the write command forwarded in parallel to the target (e.g., replication appliance) 303 340A (514A). If the target 303 sends a third acknowledgment first, the storage array 302 will not send data until the storage array 302 gets data from the host 301 after sending a fourth acknowledgment to the host 301 as coordinated by the storage arrays 302. However, in certain embodiments, the storage array 302 (e.g., Symmetrix) usually will send the third acknowledgment (e.g., XFR_RDY message) first because of its greater processing capabilities and a nominal head start processing data over the RPA because it receives the data first.

The storage array 302 then may (12) receive the last data of the data transfer phase 345 from the host 301 and (13) forward the last data of the data transfer phase to the target (e.g., replication appliance) 303 350. As described above, the storage array 302 and the target (e.g., replication appliance) 303 may (14) process the last data in parallel 355A (624). Then the storage array may (15) receive a fifth acknowledgment (e.g., status) from the target (e.g., replication appliance) 303 in response to the last set of data associated with the data transfer phase of the write command forwarded in parallel to the target (e.g., replication appliance) 303 360 (516) and (16) send a sixth acknowledgement (e.g., status) to the host 301 in response to the last set of data associated with the data transfer phase of the write command received from the host 301 365 (518).

Figure 7:
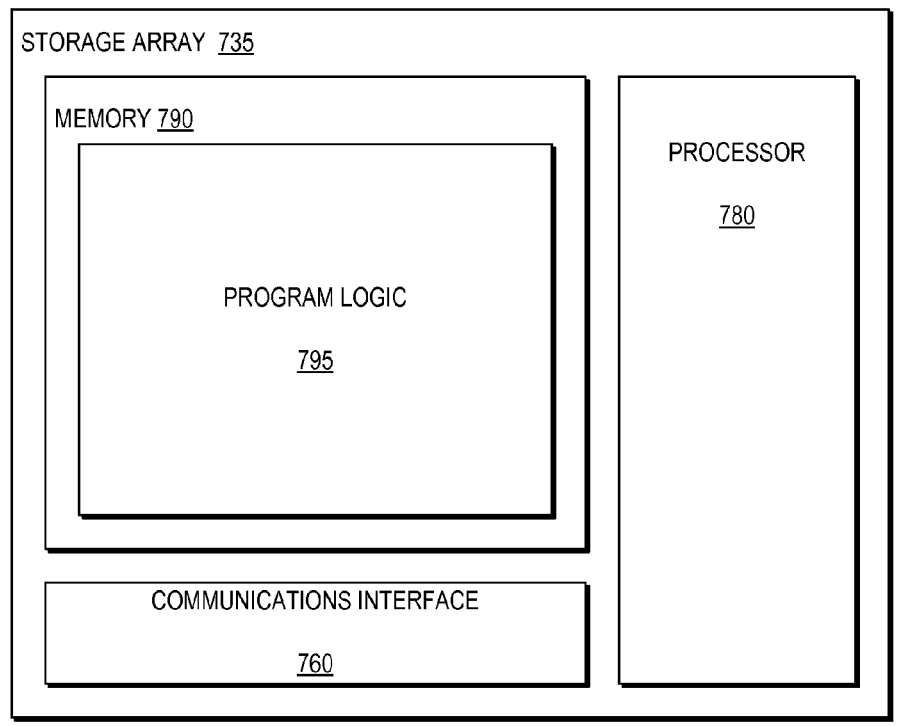
FIG. 7 is a block diagram of an example embodiment apparatus according to the present invention.
Figure 8:
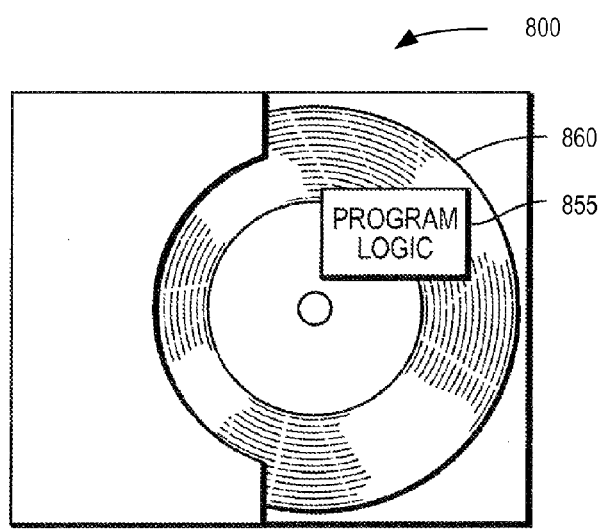
FIG. 8 is an illustration of an example embodiment of the present invention as embodied in program code.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 8 shows Program Logic 855 embodied on a computer-readable medium 860 as shown, and wherein the Logic is encoded in computer-executable code configured for carrying out the reservation service process of this invention and thereby forming a Computer Program Product 800.

The logic for carrying out the method may be embodied as part of the aforementioned system, which is useful for carrying out a method described with reference to embodiments shown in, for example, FIGS. 1-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:

receiving a command phase of a write command, comprising the command phase and a data transfer phase, from a host at a splitter at a production site in a replication environment;

splitting the command phase of the write command asynchronously to a replication appliance at a replication site in the replication environment without first processing the command phase of the write command at a storage array at the production site; and processing the write command asynchronously at the storage array at the production site in parallel with the replication appliance at the replication site, wherein said splitting further comprises:

receiving a first acknowledgment from the replication appliance at the replication site in response to the command phase of the write command split asynchronously to the replication appliance at the replication site; and sending a second acknowledgement from the storage array at the production site to the host in response to the command phase of the write command received from the host.

2. The method of claim 1 wherein receiving a command phase of a write command, comprising the command phase and a data transfer phase, from a host at a splitter at a production site in a replication environment comprises receiving a Small Computer System Interface (SCSI) Command Descriptor Block (CDB) from the host at the splitter at the production site; and wherein splitting the command phase of the write command asynchronously to a replication appliance at a replication site in the replication environment without first processing command phase of the write command at a storage array at the production site comprises sending the SCSI CDB in parallel to the replication appliance at the replication site without first enqueuing the SCSI CDB at the storage array at the production site.

3. The method of claim 1 wherein receiving a first acknowledgment from the replication appliance at the replication site in response to the command phase of the write command split asynchronously to the replication appliance at the replication site comprises receiving a first Small Computer System Interface (SCSI) Transfer Ready (XFR_RDY) message from the replication appliance at the replication site in response to a SCSI Command Descriptor Block (CDB) sent in parallel to the replication appliance at the replication site; and wherein sending a second acknowledgement from the storage array at the production site to the host in response to the command phase of the write command received from the host comprises sending a second SCSI XFR_RDY message from the storage array at the production site to the host in response to the SCSI CDB received from the host.

4. The method of claim 1 further comprising:

receiving the data transfer phase of the write command from the host at the storage array at the production site; and splitting the data transfer phase of the write command asynchronously to the replication appliance at the replication site without first processing the data transfer phase of the write command at the storage array at the production site.

5. The method of claim 4 wherein receiving the data transfer phase of the write command from the host at the storage array at the production site comprises receiving data associated with the data transfer phase of the write command; and wherein splitting the data transfer phase of the write command asynchronously to the replication appliance at the replication site without first processing the data transfer phase of the write command at the storage array at the production site comprises splitting the data associated with the data transfer phase of the write command asynchronously to the replication appliance at the replication site without first processing the data associated with the data transfer phase of the write command at the storage array at the production site.

6. The method of claim 4 wherein splitting the data transfer phase of the write command asynchronously to the replication appliance at the replication site comprises:

receiving a third acknowledgment from the replication appliance at the replication site in response to the data transfer phase of the write command split asynchronously to the replication appliance at the replication site; and sending a fourth acknowledgement from the storage array to the host in response to the data transfer phase of the write command received from the host.

7. The method of claim 6 wherein receiving a third acknowledgment from the replication appliance at the replication site in response to the data transfer phase of the write command split asynchronously to the replication appliance at the replication site comprises receiving a third Small Computer System Interface (SCSI) Transfer Ready (XFR_RDY) message from the replication appliance at the replication site in response to the data transfer phase of the write command sent in parallel to the replication appliance at the replication site; and wherein sending a fourth acknowledgement from the storage array to the host in response to the data transfer phase of the write command received from the host comprises sending a fourth SCSI XFR_RDY message to the host in response to the data transfer phase of the write command received from the host.

8. The method of claim 6 further comprising:

receiving a fifth acknowledgment from the replication appliance at the replication site in response to a last set of data associated with the data transfer phase of the write command split asynchronously to the replication appliance at the replication site; and sending a sixth acknowledgement from the storage array to the host in response to the last set of data associated with the data transfer phase of the write command received from the host.

9. The method of claim 8 wherein receiving a fifth acknowledgment from the replication appliance at the replication site in response to a last set of data associated with the data transfer phase of the write command split asynchronously to the replication appliance at the replication site comprises receiving a first Small Computer System Interface (SCSI) STATUS command from the replication appliance at the replication site in response to the last set of data associated with the data transfer phase of the write command sent in parallel to the replication appliance at the replication site; and wherein the data transfer phase of the write command sent in parallel to the replication appliance at the replication site comprises sending a second SCSI STATUS command to the host in response to the last set of data associated with the data transfer phase of the write command received from the host.

10. The method of claim 8 further comprising:

enqueuing the command phase of the write command in parallel at the storage array with enqueuing the command phase of the write command split to the replication appliance at the replication site; and processing the data transfer phase of the write command in parallel at the storage array with processing the data transfer phase of the write command split to the replication appliance at the replication site.

11. An apparatus comprising:

one or more processors; and computer program code that, when executed on the one or more processors, causes the apparatus to perform the operations of:

receiving a command phase of a write command, comprising the command phase and a data transfer phase, from a host at a splitter at a production site in a replication environment;

splitting the command phase of the write command asynchronously to a replication appliance at a replication site in the replication environment without first processing the command phase of the write command at the apparatus at the production site; and processing the write command asynchronously at the apparatus at the production site in parallel with the replication appliance at the replication site, wherein said splitting further comprises:

receiving a first acknowledgment from the replication appliance at the replication site in response to the command phase of the write command split asynchronously to the replication appliance at the replication site; and sending a second acknowledgement from the storage array at the production site to the host in response to the command phase of the write command received from the host.

12. The apparatus of claim 11 wherein receiving a command phase of a write command, comprising the command phase and a data transfer phase, from a host at a splitter at a production site in a replication environment comprises receiving a Small Computer System Interface (SCSI) Command Descriptor Block (CDB) from the host at the splitter at the production site; and wherein splitting the command phase of the write command asynchronously to a replication appliance at a replication site in the replication environment without first processing command phase of the write command at a storage array at the production site comprises sending the SCSI CDB in parallel to the replication appliance at the replication site without first enqueuing the SCSI CDB at the storage array at the production site.

13. The apparatus of claim 11 wherein receiving a first acknowledgment from the replication appliance at the replication site in response to the command phase of the write command split asynchronously to the replication appliance at the replication site comprises receiving a first Small Computer System Interface (SCSI) Transfer Ready (XFR_RDY) message from the replication appliance at the replication site in response to a SCSI Command Descriptor Block (CDB) sent in parallel to the replication appliance at the replication site; and wherein sending a second acknowledgement from the storage array at the production site to the host in response to the command phase of the write command received from the host comprises sending a second SCSI XFR_RDY message from the storage array at the production site to the host in response to the SCSI CDB received from the host.

14. The apparatus of claim 11 further comprising computer program code that, when executed on the one or more processors, causes the apparatus to perform the operations of:

receiving the data transfer phase of the write command from the host at the storage array at the production site; and splitting the data transfer phase of the write command asynchronously to the replication appliance at the replication site without first processing the data transfer phase of the write command at the storage array at the production site.

15. The apparatus of claim 14 wherein receiving the data transfer phase of the write command from the host at the storage array at the production site comprises receiving data associated with the data transfer phase of the write command; and wherein splitting the data transfer phase of the write command asynchronously to the replication appliance at the replication site without first processing the data transfer phase of the write command at the storage array at the production site comprises splitting the data associated with the data transfer phase of the write command asynchronously to the replication appliance at the replication site without first processing the data associated with the data transfer phase of the write command at the apparatus at the production site.

16. The apparatus of claim 14 wherein splitting the data transfer phase of the write command asynchronously to the replication appliance at the replication site comprises:

receiving a third acknowledgment from the replication appliance at the replication site in response to the data transfer phase of the write command split asynchronously to the replication appliance at the replication site; and sending a fourth acknowledgement from the apparatus to the host in response to the data transfer phase of the write command received from the host.

17. The apparatus of claim 16 wherein receiving a third acknowledgment from the replication appliance at the replication site in response to the data transfer phase of the write command split asynchronously to the replication appliance at the replication site comprises receiving a third Small Computer System Interface (SCSI) Transfer Ready (XFR_RDY) message from the replication appliance at the replication site in response to the data transfer phase of the write command sent in parallel to the replication appliance at the replication site; and wherein sending a fourth acknowledgement from the storage array to the host in response to the data transfer phase of the write command received from the host comprises sending a fourth SCSI XFR_RDY message to the host in response to the data transfer phase of the write command received from the host.

18. The apparatus of claim 16 further comprising computer program code that when executed on the one or more processors performs the operations of:

receiving a fifth acknowledgment from the replication appliance at the replication site in response to a last set of data associated with the data transfer phase of the write command split asynchronously to the replication appliance at the replication site; and sending a sixth acknowledgement from the apparatus to the host in response to the last set of data associated with the data transfer phase of the write command received from the host.

19. The apparatus of claim 18 wherein receiving a fifth acknowledgment from the replication appliance at the replication site in response to a last set of data associated with the data transfer phase of the write command split asynchronously to the replication appliance at the replication site comprises receiving a first Small Computer System Interface (SCSI) STATUS command from the replication appliance at the replication site in response to the last set of data associated with the data transfer phase of the write command sent in parallel to the replication appliance at the replication site; and wherein the data transfer phase of the write command sent in parallel to the replication appliance at the replication site comprises sending a second SCSI STATUS command to the host in response to the last set of data associated with the data transfer phase of the write command received from the host.

20. The apparatus of claim 11 further comprising computer program code that when executed on the one or more processors causes the apparatus to perform the operations of:

enqueuing the command phase of the write command in parallel at the apparatus with enqueuing the command phase of the write command split to the replication appliance at the replication site; and processing the data transfer phase of the write command in parallel at the apparatus with processing the data transfer phase of the write command split to the replication appliance at the replication site.

21. A computer-program product including a non-transitory computer-readable storage medium encoded with computer-program code that, when executed on a processor of a computer, causes the computer to reduce splitter latency using parallel splitting, the computer-program code comprising:

computer program code for receiving a command phase of a write command, comprising the command phase and a data transfer phase, from a host at a splitter at a production site in a replication environment;

computer program code for splitting the command phase of the write command asynchronously to a replication appliance at a replication site in the replication environment without first processing the command phase of the write command at a storage array at the production site; and computer program code for processing the write command synchronously at the storage array at the production site in parallel with the replication appliance at the replication site, wherein said computer program code for said splitting further comprises:

computer program code for receiving a first acknowledgment from the replication appliance at the replication site in response to the command phase of the write command split asynchronously to the replication appliance at the replication site; and computer program code for sending a second acknowledgement from the storage array at the production site to the host in response to the command phase of the write command received from the host.

\* \* \* \* \*